United States Patent
Poiret et al.

(10) Patent No.: US 6,746,352 B1
(45) Date of Patent: Jun. 8, 2004

(54) METHOD AND APPARATUS FOR TENSIONING A CHAIN OF AN INTERNAL COMBUSTION ENGINE

(75) Inventors: Christian Poiret, Coulogne (FR); Jean-Luc Pochet, Selles (FR); Ian Ronald Trotter, Surrey (GB)

(73) Assignee: Renold, PLC, Manchester (GB)

( * ) Notice: Subject to any disclaimer, the term of this patent is extended or adjusted under 35 U.S.C. 154(b) by 0 days.

(21) Appl. No.: 09/720,063

(22) PCT Filed: Jun. 29, 1999

(86) PCT No.: PCT/GB99/02043
§ 371 (c)(1),
(2), (4) Date: Mar. 26, 2001

(87) PCT Pub. No.: WO00/00756
PCT Pub. Date: Jan. 6, 2000

(30) Foreign Application Priority Data

Jun. 30, 1998 (GB) .............................................. 9813961

(51) Int. Cl.[7] .................................................. F16H 7/22
(52) U.S. Cl. ........................................ 474/110; 474/101
(58) Field of Search ............................ 474/69, 70, 101, 474/109, 110

(56) References Cited

U.S. PATENT DOCUMENTS

| | | | |
|---|---|---|---|
| 4,478,595 A | 10/1984 | Hayakawa et al. ......... | 474/109 |
| 4,959,042 A | 9/1990 | Tanaka et al. .............. | 474/134 |
| 5,152,261 A * | 10/1992 | Butterfield et al. ...... | 123/90.15 |
| 5,159,904 A | 11/1992 | Ingold ...................... | 123/90.15 |
| 5,176,581 A | 1/1993 | Kumm ........................ | 474/110 |
| 5,181,889 A * | 1/1993 | Maruyama et al. ......... | 474/110 |
| 5,577,970 A * | 11/1996 | Smith et al. ................ | 474/110 |
| 5,718,196 A * | 2/1998 | Uchiyama et al. ...... | 123/195 C |
| 5,733,214 A | 3/1998 | Shiki et al. .................. | 474/69 |
| 5,752,891 A | 5/1998 | Meckstroth et al. ........ | 474/110 |

FOREIGN PATENT DOCUMENTS

| | | | |
|---|---|---|---|
| EP | 01310125 | 12/1989 | ........... F02B/67/06 |
| EP | 06034002 | 2/1994 | ............. F16H/7/12 |

\* cited by examiner

Primary Examiner—David A. Bucci
Assistant Examiner—Vicky A. Johnson
(74) Attorney, Agent, or Firm—Akin Gump Strauss Hauer & Feld LLP

(57) ABSTRACT

A chain drive assembly for an internal combustion engine comprises a chain tensioner (6) that acts upon a chain (2) that is used to drive the cam shafts (4) of the engine. The tensioner has a hydraulically actuated plunger (30) which is moveable within a housing and biasing means in the form of a solenoid (34), compression spring or motor that urges the plunger outwards of the housing at least when there is no hydraulic pressure. The tensioner is controlled by means of a control unit (8) that receives signals from various transducers that transmit signals providing information in relation to the performance of the engine. The control unit receives the measured information, calculates the desired tension to be applied to the chain and transmits the control signal to the chain tensioner so as to operate the biasing means or control the hydraulic pressure so that the desired chain tension is applied.

20 Claims, 2 Drawing Sheets

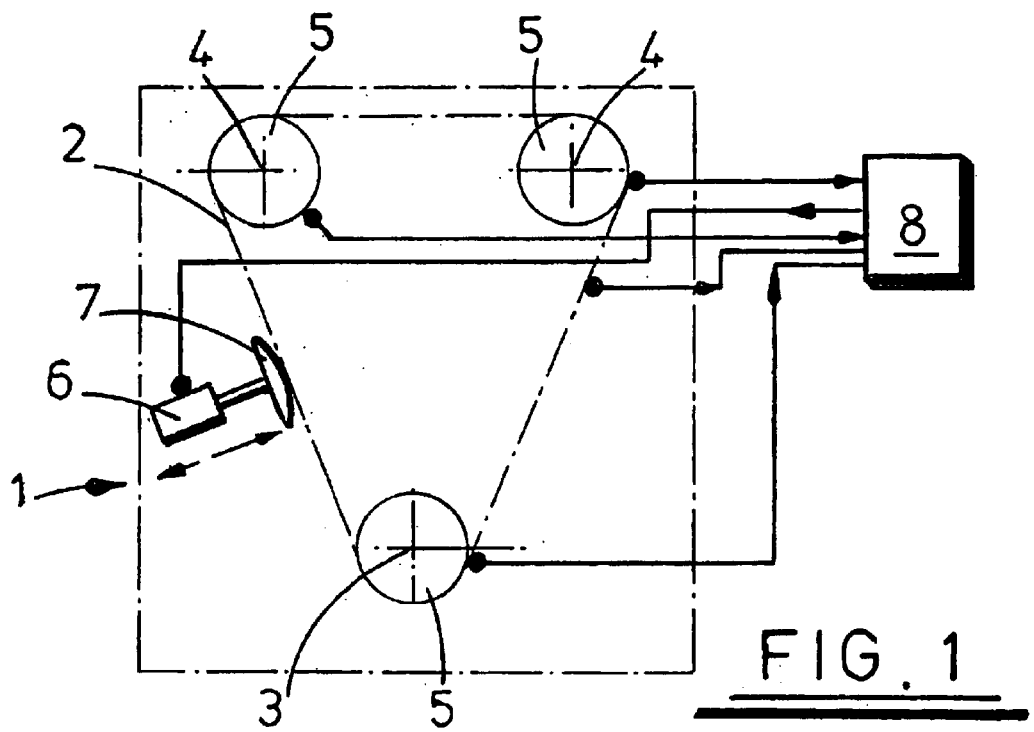
FIG. 1
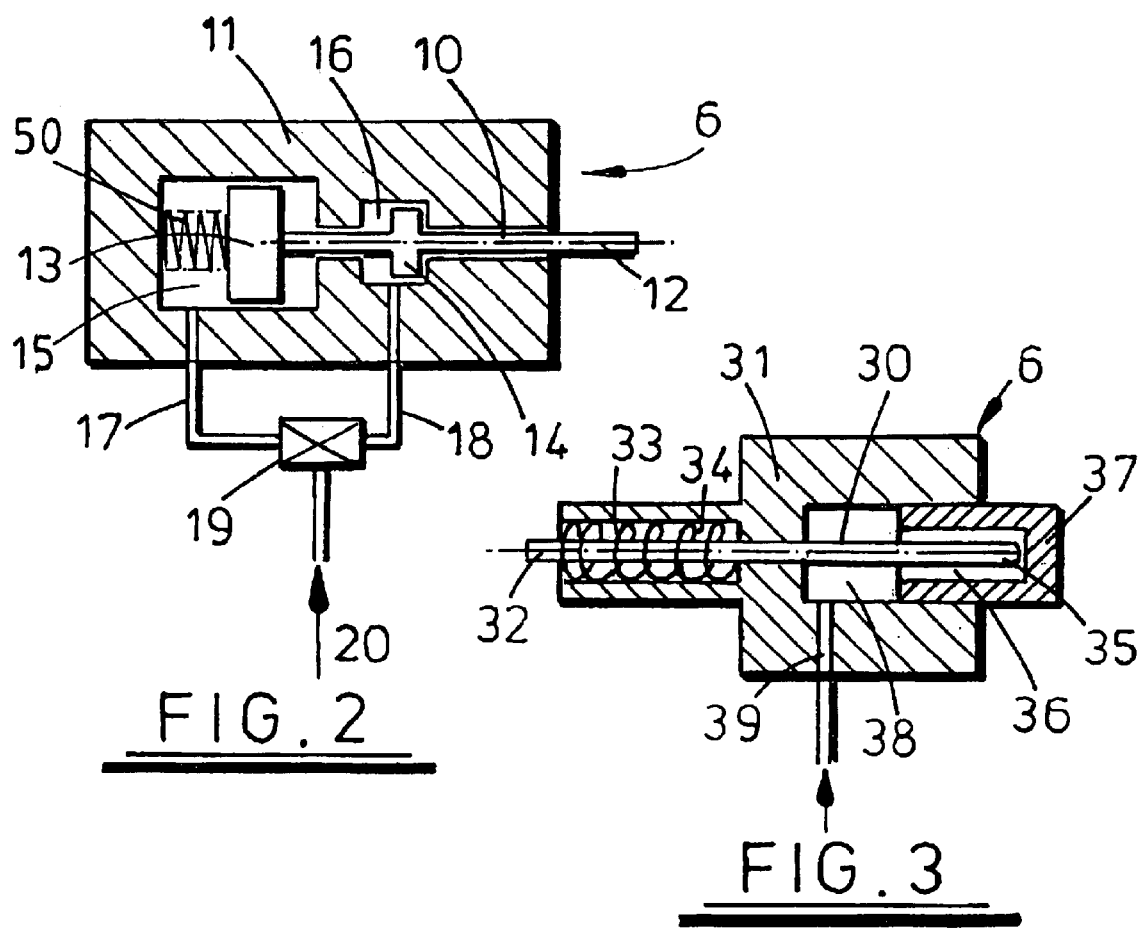
FIG. 2
FIG. 3

METHOD AND APPARATUS FOR TENSIONING A CHAIN OF AN INTERNAL COMBUSTION ENGINE

CROSS-REFERENCE TO RELATED APPLICATIONS

This application claims priority to PCT Application No. PCT/GB99/02043 filed on Jun. 29, 1999, and Great Britain Application No. 9813961.1 filed on Jun. 30, 1998.

BACKGROUND OF THE INVENTION

The present invention relates to a method for tensioning the chain of an internal combustion engine and to the related chain tensioner apparatus for performing the method.

In an internal combustion engine a continuous loop of chain is used for driving the camshafts of an engine from the output of its crankshaft. In order to compensate for any slackness in the chain that often occurs as a result of wear, a chain tensioner is used. Generally a chain tensioner comprises a hydraulic piston that is guided longitudinally in a bore of a housing and is biased into contact with the chain by meanes of the hydraulic pressure within the bore and/or a compression spring that acts between the piston and the housing. An end of the piston that projects from the housing is fitted with a shoe that rests on the chain to apply the appropriate tensioning force. When the piston is acted upon by the hydraulic pressure and/or spring force the chain is tensioned by the shoe. The hydraulic fluid also provides damping of the piston movement during use.

The hydraulic fluid in the chain tensioner is generally derived from the engine supply. The compression spring is designed to apply tension to the chain when the engine is off or during engine start up as at these times there is no or little hydraulic pressure. During normal operation of the engine the chain tensioner is tensioned by both the hydraulic pressure and the spring force. In most existing systems the chain tensioner is designed to ensure that sufficient tension is applied to accommodate all operating conditions and this results in the chain being over-tensioned for significant periods of it use. Maximum tension is required at engine start-up or at periods of rapid acceleration or deceleration when significant wear and noise can occur in taking up the slack of the chain, thereafter during normal use the chain is generally over-tensioned which itself contributes to noise and wear.

Mechanical tensioner that use only a spring force to bias the tensioning shoe are often used on belt systems offer constant tensioning loads that may be adequate for the start-up of the engine but which are over-compensatory when the engine is idling or operating at a constant speed.

In chain tensioner designs where hydraulic fluid is taken from the engine supply the pressure of the hydraulic fluid may increase with engine speed thereby increasing the tension of the chain unnecessarily. This increases the wear of the chain.

It will be appreciated that the problem with existing chain tensioners is that they are not responsive to the condition of the engine and are unable to apply a tension force that is variable in accordance with the requirements of the chain.

U.S. Pat. No. 5,159,904 describes a chain tightener system in which an electric control unit records one or more parameters of the operation of the engine and, in response effects a progressive and constant variation of the angular phase of rotation of the crankshaft and camshafts of an engine. This is achieved by using a pair of chain tighteners; one on the slack side of the chain and one on the tight side, However this arrangement cannot provide control over the chain noise, wear, vibration or harshness.

It is an object of the present invention to obviate or mitigate the aforesaid

SUMMARY OF THE INVENTION

According to a first aspect of the present invention there is provided a chain drive assembly for reducing noise, vibration or wear of a chain in an internal combustion engine, the assembly comprising a chain tensioner having a hydraulically actuated plunger for engaging a chain, the plunger being moveable within a housing and biasing means to bias the plunger outwards of its housing at least when there is no hydraulic pressure, means for controlling hydraulic pressure in the housing, means for measuring the projection of the plunger from the housing, means for measuring an operational parameter of the engine or drive assembly, means for calculating the desired chain tension in response to the measured operational parameter and means for transmitting a control signal to the chain tensioner so as to operate the biasing means or thee means for controlling the hydraulic pressure in the housing so as to control the projection of the plunger to apply the desired chain tension.

The achieve control of the chain tension not only reduces the noise etc. but provides for extended chain life.

The biasing means for controlling the projection of the plunger from the housing is preferably a solenoid, motor or a compression spring.

In one preferred embodiment the plunger is biased against a sliding member by actuation of the solenoid or motor. Hydraulic fluid may be supplied to the housing so as to act separately on the sliding member.

Preferably the desired chain tension is applied during operation of the chain.

The control signal may operate a control valve to control the flow of hydraulic fluid to the housing. The housing may have a plurality of chambers each receiving a different sized plunger member.

The operational parameter may be one or more of any of the following: the speed of r revolution of a crankshaft of the engine; the speed of revolution of at least one camshaft of the engine; the torque of the crankshaft; the torque of at least one of the camshafts; the relative phase of rotation of the crankshaft and at least one camshaft; the pressure of the hydraulic fluid in the chain tensioner; or the strain in the chain.

According to a second aspect of the present invention there is provided a method for tensioning the chain of a chain drive assembly so as to reducing noise, vibration or wear of the chain in an internal combustion engine, the drive assembly including a chain tensioner having a hydraulically, operated plunger that is moveable within a housing and biasing means to bias the plunger outwards of its housing at least when there is no hydraulic pressure, the method comprising the steps of measuring an operational parameter of the engine or drive assembly, measuring the projection of the plunger from the housing, calculating the desired chain tension in response to the measured operational parameter, transmitting a control signal to the chain tensioner so as to operate the biasing means or to change the hydraulic pressure in the housing so as to move the plunger to apply the desired chain tension.

BRIEF DESCRIPTION OF THE DRAWINGS

Specific embodiments of the present invention will now be described, by way of example only, with reference to the accompanying drawings in which:

FIG. 1 is a diagrammatic end view of an internal combustion engine shown with a drive chain and chain tensioner of the present invention;

FIG. 2 is a schematic view of a first embodiment of a chain tensioner of the present invention;

FIG. 3 is a schematic view of a second embodiment of a chain tensioner of the present invention.

DETAILED DESCRIPTION

Figure 4:
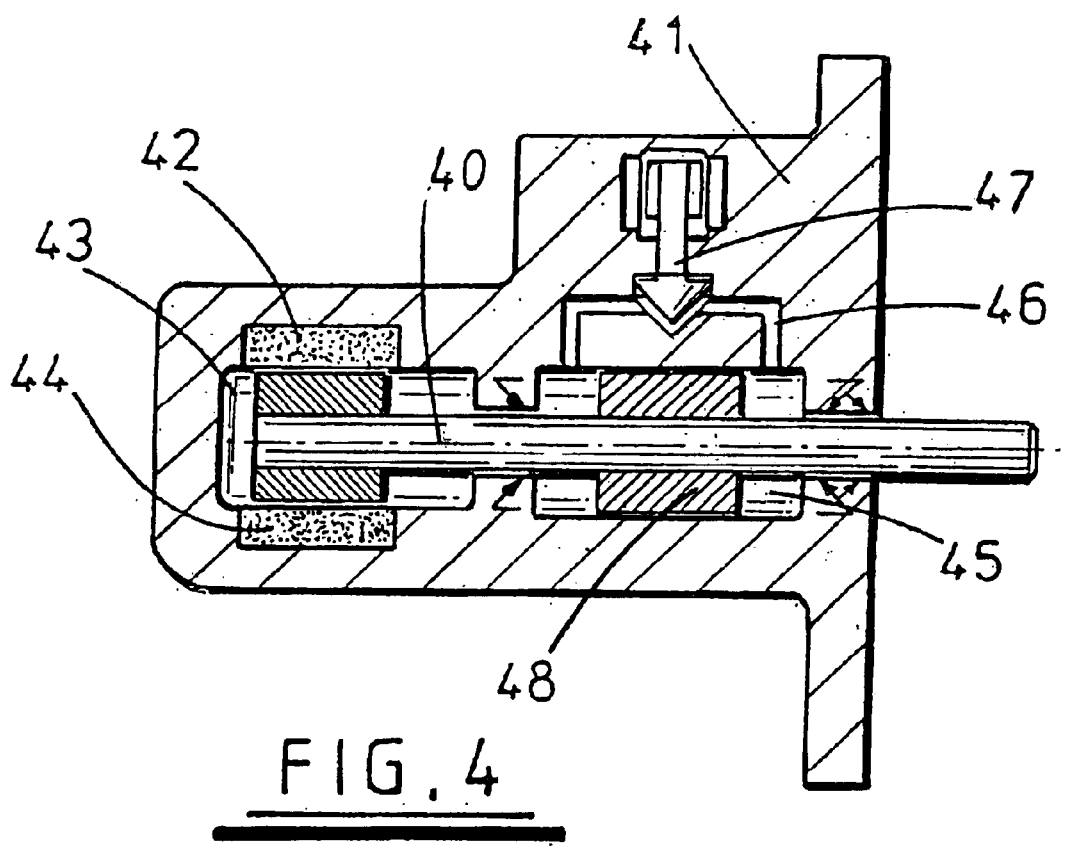
FIG. 4 is a sectioned schematic representation of a third embodiment of a chain tensioner of the present invention.
Figure 5:
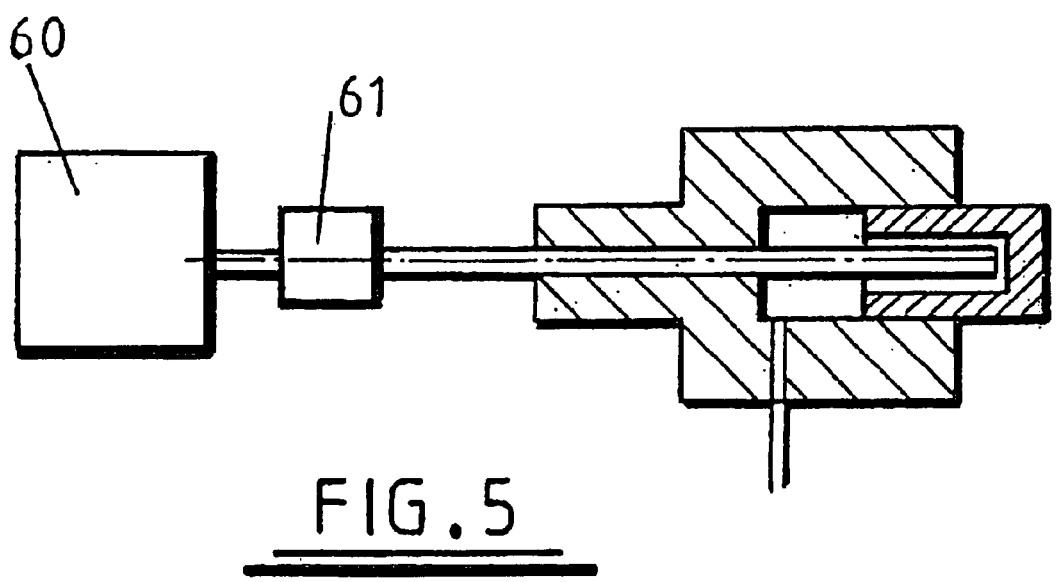

Referring now to FIG. 1 of the drawings, there is shown in a diagramatic representation an internal combustion engine 1 of an automotive vehicle with a drive chain 2 for transmitting power from the output of a crankshaft 3 of the engine 1 to overhead camshaft 4.

The drive chain 2 is in die form of an endless loop that passes around sprockets 5 attached to the ends of the crankshaft 3 and the camshafts 4. A chain tensioner 6, examples of which are described in detail below, maintains tension in the chain 2 via a tensioning shoe 7 throughout its use.

The operation of the chain tensioner 6 is controlled by a control unit 8 which includes a processor that receives information signals from various parts of the engine 1 and activates the chain tensioner 6 in response to those signals. The control unit 8 may form part of an engine management system. In the example shown in FIG. 1, signals are received from appropriate transducers associated with the crankshaft 3, the camshafts 4, the chain 2 itself and tie chain tensioner 6 and this information is processed to determine the appropriate tension that should be applied to the chain 2 via the chain tensioner 6. The signals received from the crankshaft 3 and camshafts 4 may convey information relating to the torque and/or the relative angular rotational phase of the shafts. Transducers such as optical encoders, accelerometers may be used for this purpose. The chain may be fitted with strain gauges so that information relating to thy strain or load of the chain can be processed by the control unit. In addition, transducers such as proximity sensors or infra-red or laser sensors may be used to transmit signals relating to the position of a plunger of the chain tensioner or tensioning shoe to the control unit.

The purpose of the above arrangement is to control the chain tensioner such that an appropriate tensioning force is applied so as to that take into account the operating conditions of the drive chain and engine and to ensure that over-compensatory tension is not applied to the chain. The operation of this reactive chain tensioner ensures that undue chain wear, noise vibration or harshness is not incurred.

Example embodiments of the chain tensioner 6 are shown in FIGS. 2, 3 and 4. In the embodiment shown in FIG. 2, the tensioner 6 is principally hydraulic and comprises a plunger 10 that is axially guided within a housing 11 and has an end 12 that projects from the housing 11 to make contact with the chain 2 via a tensioning shoe (not shown in FIG. 2). The plunger 10 has two spaced cylindrical heads 13, 14, one (13) relatively large and one (14) relatively small, both being moveable with the plunger 10 relative to first and second chambers 15, 16 in the housing 11. Each chamber 15, 16 is fed with a supply of hydraulic fluid from the engine supply via separate chamber inlet conduits 17, 18 in the housing 11. Upstream of the inlets 17, 18 there is a control valve 19 that operates to switch the hydraulic fluid from the supply 20 to one or the other of the chamber inlets 17, 18. In use, high tensioning forces are applied by the hydraulic fluid being directed by the control valve 19 into the first chamber 15 For a given hydraulic pressure a large force is applied by virtue of the large surface area of the plunger head 13 Low tensioning forces are applied by directing the hydraulic fluid into the second chamber 16 where a smaller surface area of the plunger head 14 means that a smaller force is applied to the plunger for a given hydraulic fluid pressure. This design of chain tensioner 6 enables a relatively high tension to be applied to the chain when required at low engine speeds and a relatively low tension to be applied at relatively low engine speeds. Signals from a transducer associated with the crankshaft provide information relating to the revolutions per minute of the engine and are used to determine the tension to be applied to the chain tensioner. Once the appropriate tensioning force has been calculated by the control unit a signal is sent to switch the control valve 19 to the appropriate position: It will be appreciated that whilst the tensioner 6 is shown with only two chambers it may be designed to have more so that the tension of the chain can be adjusted in finer increments according to the speed of the engine. The tensioner is also provided with means, such as a compression spring, for biasing the plunger into contact with the chain during start-up when there is little or no hydraulic pressure in the chain tensioner housing.

The hydraulic fluid present in the housing of the chain tensioner also serves to damp movement of the plunger, as is known.

In FIG. 3 there is shown a chain tensioner that is particularly suitable for controlling the tension at engine start-up of the engine. The tensioner alas a plunger 30 that is moveable axially within a housing 31. One end 32 of the plunger 30 is received in the coil 33 of an electric solenoid 34 attached to the rear of the housing 31, whilst the other end 35 extends into a bore 36 in a cylinder 37 that is slidably received in a chamber 38 in the housing. The chamber 38 has an inlet conduit 39 that is supplied with hydraulic fluid from the engine oil supply. In use activation of the solenoid 34 by a control signal biases the plunger 30 into the sliding cylinder 37 so as to force the cylinder 37 to project out of the housing 31 and bear against the drive chain via a tensioning shoe if necessary. The supply of fluid to the chamber 38 applies pressure to the ends of the cylinder 37 to bias it out of die housing 31. If the engine is started after a prolonged stoppage the hydraulic pressure of the engine supply is generally not sufficient to supply the chamber 38 of the chain tensioner housing 31. Accordingly the solenoid 34 is activated by a control signal so as to apply a tensioning force to the chain via the plunger 30 and cylinder 37. When normal operating conditions of the engine have resumed the hydraulic pressure has risen to an extent that tensioning force can be applied to the chain by virtue of the hydraulic pressure acting on the cylinder 37 and the solenoid 34 may be switched off. This design is beneficial not only at start up but at tires of rapid acceleration or deceleration where the increase or decrease in hydraulic pressure lags the increase or decrease in speed of the engine. In such circumstances the solenoid may be operated so as to apply sufficient tensioning force during acceleration or deactivated to reduce the applied tension during deceleration.

A similar but more detailed design is shown in FIG. 4. The tensioner, as before, has a plunger 40 that is axially moveable within a housing 41. The end of the plunger 40 received in the housing 41 carries a magnet 42 which is moveable with the plunger 40 in a first chamber 43 of the housing 41 under the influence of a solenoid coil 44 that surrounds the first chamber 43.

A second chamber 45 is disposed in the housing 41 between the first chamber 43 and the exposed end of the plunger 40. The second chamber 45 is connected to a supply of hydraulic fluid by a two limbed conduit 46 that is disconnectable from the supply by a electrically operated needle valve 47. The plunger 40 has a head 48 that resides in the second chamber 45 and serves as a hydraulic damper.

The tensioner is typically powered from a 12V battery of the vehicle and the solenoid coil 44 is supplied with a variable electric current to modulate the tensioner load as required. The variable current may be either constant at a constant engine speed or alternatively may be variable to stimulate the hydraulic damper if the control is a closed loop system. The hydraulic damper can be switched on or off as desired by the electrically operated needle valve 47.

The solenoid of the above embodiments may be substituted by an alternative actuator such as a stepper motor with leadscrew. In all these designs the tensioning force applies is variable in discrete steps by applying an appropriate control signal that governs the power supplied to the motor or solenoid to control length of stroke of the plunger.

In all designs the information signals received by the control unit are processed by a feedback control loop that may include an integrator or differentiator. Alternatively the information may be processed by using a simple look-up table to calculate the required tension to be applied.

It is to be appreciated that in all embodiments the tension applied to the chain can be varied during operation of the chain so that rapid responses are made to changes in the engine speed etc.

The provision of an active chain tensioner that reacts to the precise loading requirements as described above enables chain noise and vibration to be efficiently and effectively controlled whilst keeping the load applied to a chain to a minimum thereby reducing chain wear. This is particularly desirable during rapid changes in the engine speed or when the engine is started from cold. The chain drive thus has increased durability and by monitoring the tension applied the life of the chain can be accurately predicted.

It will be appreciated that numerous modifications to the above described design may be made without departing from the scope of the invention as defined in the appended claims. For example, signals can be derived from appropriate transducers do obtain other information from the engine and/or drive assembly such as the strain in or position of chain guide shoes, or the pressure of the hydraulic fluid as supplied to the chain tensioner. In the latter case the chain tensioner can be controlled to ensure that unnecessary tension is not applied when the hydraulic pressure is abnormally high.

Whilst the chain tensioner is described above in relation to a camshaft drive it is to be appreciated that it has application to other engine chain drives such as those used to drive an oil pump, balance shaft drives or a water pump. In these cases signals relating to torque or speed of rotation arc derived from the pump or shaft drives in order to ascertain the tension to be applied to the chain.

What is claimed is:

1. A chain drive assembly for reducing noise, vibration or wear of a chain in an internal combustion engine, the assembly comprising.
    a) a chain tensioner mounted on said engine, the tensioner comprising:
        i) a housing;
        ii) a hydraulically actuated plunger for engaging the chain, the plunger being moveable within said housing,
        iii) a fluid chamber defined between the plunger and the housing for containing hydraulic fluid, the fluid serving to activate and damp movement of the plunger;
        iv) biasing means to bias the plunger outwards of the housing;
        v) a passage in said housing to provide communication between the chamber and a fluid supply from the engine;
    b) conduit means connecting a supply of hydraulic fluid in the engine to said passage;
    c) control valve means in said conduit means for increasing and decreasing the pressure of the hydraulic fluid supplied to the chamber;
    d) means for measuring a location of the plunger within the housing;
    e) means for measuring an operational parameter of the engine or drive assembly;
    f) means for calculating the desired chain tension in response to the measured operational parameter; and
    g) means for transmitting a control signal to the chain tensioner so as to operate the control valve means to control the hydraulic pressure supplied to the chamber and therefore to control the projection of the plunger to apply the desired chain tension.

2. A chain drive assembly according to claim 1, wherein the desired chain tension is applied during operation of the chain drive assembly.

3. A chain drive assembly according to claim 1, wherein the biasing means of the plunger is a solenoid, a motor or a compression spring.

4. A chain drive assembly according to claim 3, wherein the plunger is biased against a sliding member by actuation of the solenoid or motor.

5. A chain drive assembly according to claim 4, wherein hydraulic fluid is supplied to the housing so as to act separately on the sliding member.

6. A chain drive assembly according to claim 6, wherein the housing has a plurality of chambers each receiving a different sized plunger member.

7. A chain drive assembly according to claim 1, wherein the operational parameter is the speed of revolution of a crankshaft of the engine.

8. A chain drive assembly according to claim 1, wherein the biasing means is an electrically operated solenoid that is supplied with a variable current to modulate the tensioner load.

9. A chain drive assembly according to claim 1, wherein the operational parameter is the speed of revolution of at least one camshaft of the engine.

10. A chain drive assembly according to claim 1, wherein the operational parameter is the torque of the crankshaft.

11. A chain drive assembly according to claim 1, wherein the operational parameter is the torque of at least one of the camshafts.

12. A chain drive assembly according to claim 1, wherein the operational parameter is the relative phase of rotation of the crankshaft and at least one camshaft.

13. A chain drive assembly according to claim 1, wherein the operational parameter is the pressure of the hydraulic fluid in the chain tensioner.

14. A chain drive assembly according to claim 1, wherein the operational parameter is the strain of the chain.

15. A method for tensioning the chain of a chain drive assembly so as to reduce noise, vibration or wear of the chain in an internal combustion engine, the drive assembly including a chain tensioner comprising a hydraulically operated plunger that is moveable within a housing, a fluid chamber defined between the plunger and housing for containing hydraulic fluid, the fluid serving to activate and damp movement of the plunger, biasing means to bias the plunger outwards of its housing, a passage in said housing to provide communication between the chamber and the fluid supply from the engine, and control valve means in said passage for controlling the pressure of the hydraulic fluid supplied to the housing, the method comprising the steps of:

measuring an operational parameter of the engine or drive assembly, measuring a location of the plunger within the housing, calculating the desired chain tension in response to the measured operational parameter, and transmitting a control signal to the chain tensioner so as to operate the control valve means to increase and decrease the hydraulic pressure supplied to the housing and therefore to control the projection of the plunger to apply the desired chain tension.

16. A chain drive assembly for reducing noise, vibration or wear of a chain in the assembly an internal combustion engine, the assembly comprising:

a) a chain tensioner mounted on said engine, the tensioner comprising:
   i) a housing;
   ii) a hydraulically actuated plunger for engaging the chain, the plunger being movable within said housing the plunger comprising a plurality of plunger members;
   iii) a plurality of discrete fluid chambers defined in the housing for containing hydraulic fluid, each plunger member being received in a respective chamber and each plunger member having a different working surface area presented to the hydraulic fluid, the hydraulic fluid serving to activate and damp movement of the plunger member received in the respective chamber;
   iv) biasing means to bias the plunger out of the housing;
   v) a passage in said housing to a provide communication between the chambers and a fluid supply from the engine;
   vi) conduit means connecting a supply of hydraulic fluid in the engine to said passage;
b) control means for directing the hydraulic fluid to one or more of the chambers in the housing for increasing and decreasing the pressure of the hydraulic fluid;
c) means for measuring a location of the plunger within the housing,
d) means for measuring an operational parameter of the engine or drive assembly;
e) means for calculating the desired chain tension in response to the measured operational parameter; and
f) means for transmitting a control signal to the chain tensioner so as to operate the control means to direct the hydraulic fluid supplied to the appropriate chamber or chambers so as to control the projection of the plunger and to apply the desired chain tension.

17. A chain drive assembly according to claim 16, wherein each plunger member is of a different size.

18. A method for tensioning the chain of a chain drive assembly so as to reduce noise, vibration or wear of the chain in an internal combustion engine, the drive assembly including a chain tensioner comprising a hydraulically operated plunger that is moveable within a housing, a plurality of discrete fluid chambers defamed in the housing for containing hydraulic fluid, biasing means to bias the plunger outwards of its housing, a passage in said housing to provide communication between the chambers and the fluid supply from the engine, the plunger having a plurality of plunger members, each plunger member being received in a respective chamber and each having a different working surface area presented to the fluid, the fluid serving to activate and damp movement of the plunger member in the respective fluid chamber, and control valve means for directing the hydraulic fluid to one or more of the chambers for increasing and decreasing the pressure of the hydraulic fluid, the method comprising the steps of:

measuring an operational parameter of the engine or drive assembly;

measuring a location of the plunger within the housing;

calculating the desired chain tension in response to the measured operational parameter; and transmitting a control signal to the chain tensioner so as to operate the control valve means to direct the hydraulic fluid to the appropriate chamber or chambers so as to control the projection of the plunger and therefore to apply the desired chain tension.

19. A chain drive assembly for reducing noise, vibration or wear of a chain in the assembly an internal combustion engine comprising a chain tensioner comprising;

a) a chain tensioner mounted on said engine, the tensioner comprising:
   i) a housing;
   ii) a hydraulically actuated plunger for engaging the chain, the plunger being movable within said housing;
   iii) a fluid chamber defined between the plunger and the housing for containing hydraulic fluid, the fluid serving to activate and damp movement of the plunger;
   iv) electrically actuated biasing means to bias the plunger out of the housing;
   v) a passage in said housing to provide communication between the chamber and a fluid supply from the engine;
b) conduit means connecting a supply of hydraulic fluid in the engine to said passage;
c) control means for controlling the biasing force applied by the biasing
d) means for measuring a location of the plunger within the housing;
e) means for measuring an operational parameter of the engine or drive assembly;
f) means for calculating the desired chain tension in response to the measured operational parameter;
g) means for determining the hydraulic pressure of the fluid in the chamber;
h) means for transmitting a control signal to the chain tensioner so as to operate the control means to control the biasing force applied to the biasing means and therefore to control the projection of the plunger to apply the desired chain tension, and to switch off the biasing means when the determined hydraulic pressure reaches a predetermined threshold.

20. A method for tensioning the chain of a chain drive assembly so as to reduce noise, vibration or wear of the chain in an internal combustion engine, the drive assembly including a chain tensioner comprising a hydraulically operated plunger that is moveable within a housings a fluid chamber defined between the plunger and housing for containing hydraulic fluid, the fluid serving to activate and damp movement of the plunger, electrically actuated biasing means for biasing the plunger outwards of its housing, a passage in said housing to provide communication between the chamber and the fluid supply from the engine, and control means for controlling the biasing force applied by the biasing means, the method comprising the steps of:

measuring an operational parameter of the engine or drive assembly;

measuring a location of the plunger within the housing;

calculating the desired chain tension in response to the measured operational parameter; and transmitting a control signal to the chain tensioner so as to operate the control means to control the biasing force applied by the biasing means thereby controlling the projection of the plunger to apply the desired chain tension, determining the hydraulic pressure in the chamber, switching off the biasing means when the determined hydraulic pressure reaches a predetermined threshold value.

\* \* \* \* \*